April 19, 1966  R. K. BOYER  3,246,680
WHEEL RIM HOLE SEALING GROMMET ASSEMBLY
Filed Jan. 27, 1964

INVENTOR
RALPH K. BOYER
BY Teagno, Stout & Sadler
ATTORNEY

3,246,680
WHEEL RIM HOLE SEALING GROMMET ASSEMBLY
Ralph K. Boyer, Cleveland, Ohio, assignor to Eaton Manufacturing Company, Cleveland, Ohio, a corporation of Ohio
Filed Jan. 27, 1964, Ser. No. 340,285
6 Claims. (Cl. 152—427)

The present invention relates to sealing means and more particularly to improved devices for sealing a valve stem aperture which may be provided in conventional vehicle wheel rims.

While valve stem sealing means or devices for precluding loss of air around the valve stem of a vehicle rim are not broadly new, such means or devices developed heretofore have been confined to sealing a hole for a valve stem which projects therethrough substantially normal to the plane of the seat area of the seal. In other words, the prior art devices have been directed to sealing a rim hole and the surrounding area thereof which provides the seat for the seal, which lie substantially in a common plane and which are substantially perpendicular to the projecting valve stem.

The present day trend of manufacture of vehicle rims is to provide a rim hole or aperture for a valve stem in an area of the rim which lies on a radius or in an area which is of curved or irregular configuration so that the valve stem hole or aperturre and/or the area immediately adjacent thereto which provides a seat for the seal, no longer lies in a common plane. Furthermore, the valve stem projecting through such an opening or aperture is not necessarily disposed normal to the sealing area or to the aperture, thus presenting a problem of providing an air-tight seal thereabout and thus creates a need for the improved sealing grommet assembly of the instant inventive concept.

Accordingly, one primary object of the present invention is to provide improved sealing means of the character described which will preclude and/or retard the instantaneous escape of air through a valve stem aperture of a wheel rim which is located as described and disclosed above, of that air which has found its way for any reason into a tire casing which surrounds an inner tube. The obvious advantage is to provide some margin of safety for the limited continued operation of the vehicle until the reason for such escaping air may be remedied.

Another object of the present invention is to provide improved sealing means of the character described which readily lends itself to providing the prerequisite seal completely around a valve stem irrespective of whether the area surrounding a rim hole, which provides the seal for the shortcomings of inaccuracies of the rim hole location by wheel manufacturers.

A still further object of this invention is to provide an improved valve stem sealing grommet assembly which is provided with a sealing element and shell enclosure therefore that is adapted to remain substantially stationary so as to be able to establish and maintain a fixed position with respect to a rim and valve stem of a wheel structure by a securing nut which is freely rotatable with respect to the shell enclosure during tightening down thereof to effect the seal.

Preferred means of achieving the foregoing objectives is to provide a rim hole sealing grommet assembly which comprises an internally threaded rim nut having a hex head to facilitate the turned down thereof on a complementally threaded valve stem with which the rim nut may be adapted to be used, with the rim nut carrying a washer disposed around an integrally formed cylindrical shoulder or body extension provided with an outwardly turned annular lip adjacent an end portion thereof, a deformable cylindrical shell or sleeve member fabricated of a durable, light weight but deformable material having an inwardly turned annular lip disposed adjacent one end portion for serving to loosely retain the shell in assembly with the rim nut by means of the latter's outwardly turned annular lip, a cylindrical sealing grommet or element disposed and retained within the said shell intermediate the sleeved end portion of the sealing grommet and the outwardly turned annular lip carried by the rim nut.

Other objects and important features of the invention will be apparent from a study of the specification following, taken with the drawing, which together show, illustrate, describe, and disclose certain preferred embodiments or modifications of the invention and what is now considered to be the best mode of practicing the principles thereof. Still other embodiments or modifications may be suggested to those having the benefit of the teachings herein, and such other embodiments or modifications are intended to be reserved especially as they fall within the scope and spirit of the subjoined claims.

In the drawing:

FIGURES 1 and 2 are fragmentary cross-sectional views illustrative of vehicle wheel rims having inaccurately positioned valve stem holes disposed in an irregular surface of the rims which are generally concave and convex configurations respectively, and with a rim sealing grommet assembly shown in disassociated relation with respect to a valve area of a tire and/or inner tube, the latter of which are both shown in broken outline;

Figure 1:
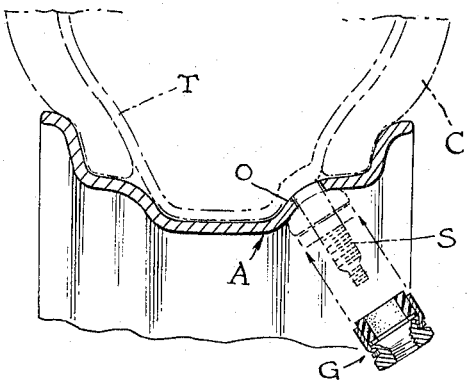
Figure 2:
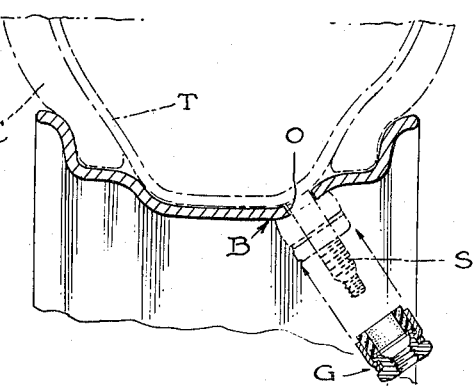

Attention is now directed to FIGURES 1, 2, 7 and 8 of the drawing wherein the invention is depicted in association with the different embodiments of apertured wheel rims A and B respectively, with the wheel rim A having a valve stem aperture O formed in an irregular area of the rim A which is generally concave in cross-section, while the wheel rim B is provided with the valve stem aperture O being formed in another irregular area of the rim B which is generally convex in cross-section. In both embodiments of the inventive concept as illustrated, there is depicted a tire casing C mounted upon each of the rims A and B with the casing C having an inner tube T provided with a projecting valve stem S shown in broken outline, and an improved sealing grommet assembly G which defines the inventive concept of the instant application.

While the subject inventive concept has been illustrated and shall be disclosed and described in the environment of the wheel rims A and B, each of which is provided with the inner tube T and the tire casing C, it is to be understood that the improved sealing grommet assembly G is also operable in the environment of a tubeless type tire carcass.

FIGURES 3–6 inclusive, are more clearly illustrative of the structural details of the components of the grommet assembly G, with such components comprising a rim nut body 10 provided with internal, axially disposed threads 12 for engagement with the externally threaded valve stem S, so that the nut body 10 may be threaded down upon the valve stem S by means of any suitable tool or wrench (not shown) which is applicable to a tool-engaging head such as a hex-head 14.

Figure 6:
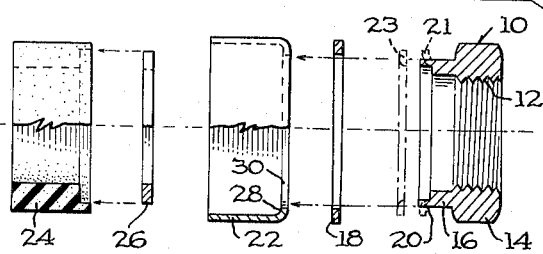
FIGURE 6 is an exploded or disassembled view of the grommet assembly components shown partially in elevation and partially in cross-section.
Figure 4:
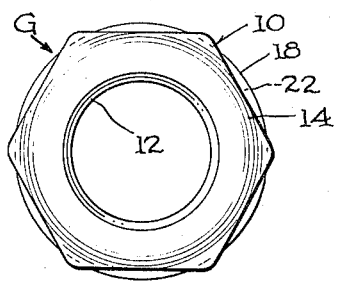
FIGURE 4 is a top plan view of the outermost end of the grommet assembly of FIGURE 3.

The nut body 10 may be fabricated of any suitable material, such as chromium plated brass, and is provided with a relatively short cylindrical shoulder or tubular axial extension 16 integrally formed adjacent to the nut head 14. The extension 16 carries thereon a loosely fitting washer 18 and is provided with a terminal end portion 20 of considerable reduced wall thickness, as shown in FIGURE 6, which may be turned or flared radially outward for assembly purposes to be explained in more detail hereinafter.

A substantially cylindrical shell or sleeve 22, which houses the major portion of a compressible tubular sealing member or grommet 24 and a bearing washer 26, is fabricated of a lightweight material which may also be chromium plated brass and which is somewhat deformable under nut-tightening pressure. The grommet 24 is provided with an internal diameter slightly greater than the outside diameter of the threads or the valve stems. The shell or sleeve 22 is provided adjacent one end portion thereof with an inwardly turned annular lip 28 defining an opening 30 of a size slightly larger than the outside diameter of the cylindrical body extension 16 of the rim nut body 10.

Figure 3:
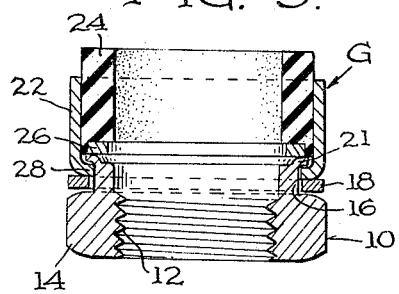
FIGURE 3 is an enlarged longitudinal cross-sectional view of the improved grommet sealing assembly of this invention.

The shell 22 is retained in assembly with the nut body 10 by slipping the lip end 28 of the shell 22 over the body extension 16, with the washer 18 being freely interposed between the nut head 14 and the lip 28, whereupon the thin walled terminal end portion 20 is then outwardly flared to define a relatively thin assembly-retaining flange or lip 21 as shown more clearly in FIGURE 3 of the drawing.

The washer 26, described in conjunction with the sealing grommet 24, both of which are disposed within the shell 22, may be either unitarily molded into or merely be freely seated against one end portion of the grommet 24.

It is to be noted that the short extension or shoulder area between the nut-head 14 of the nut body 10 and the shell-retaining lip 21 is of a slightly greater width than the combined thickness of the washer 18 and the thickness of the inwardly turned lip 28 of the shell 22, in order to provide a relatively loose assembly or fit thereof to aid in facilitating axial alignment of the entire assembly G when being applied to the valve stem S.

Furthermore, due to the particular construction aforesaid, when the grommet assembly G is applied to the valve stem S and the sealing element 24 is directed into contact with the rim A or B, the sealing element 24 and the deformable shell 22 will remain stationary, through the bearing relationship of the washer 26 to the lip 28 of the shell 22, and thus maintain a fixed position relative to the rim A or B and the respective valve stems. It is apparent, therefore, that this structural arrangement facilitates complete sealing engagement around the valve stem S and rim hole or aperture O, responsive to continued tightening of the nut body 10, whereupon the shell 22 is deformed to supportingly confine and positively seal the sealing grommet 24 according to the environmental contour of the rim area which is immediately adjacent the hole or aperture O.

Additionally, the lip 21 of the nut body 10 is formed of the reduced or thinned annular wall section 20, is of particular significance in structural detail and is operable to retain the parts or components of the assembly G in assembled relationship during manufacture and shipping prior to actual use thereof. Upon application to the valve stem S, the lip 21 of the nut body 10 is sheared off and becomes merely a free floating ring 23, as shown in dotted outline in FIGURE 6 of the drawing.

Figure 9:
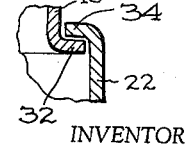
FIGURE 9 is a fragmentary cross-sectional view relating to a specific constructional detail.

Alternatively, a lip configuration 32, note FIGURE 9, may be used in lieu of the specially formed or inherently weakened reduced wall area 20 of the rim nut 10, so that the lip 32 will not shear off during application, but will merely become wedged against a cooperating lip 34 of the shell 22 with the resultant tendency of the shell or sleeve member 22 to commence to rotate when it should remain stationary, as described hereinabove.

The operation of the improved sealing grommet assembly G is apparent from the foregoing detailed description and need not be redescribed. It is also apparent that by use of the present invention with its lightweight, readily deformable shell member 22, the sealing element or grommet 24, is deformably confined within the shell member 22 and positively seated completely against any irregularly contoured surface of the wheel rim A or B to effect an air-tight seal around the entire circumference of the sealing element or grommet 24, irrespective of non-uniform placement of the rim hole or aperture O or the angular disposition of the valve stem S therethrough.

Figure 7:
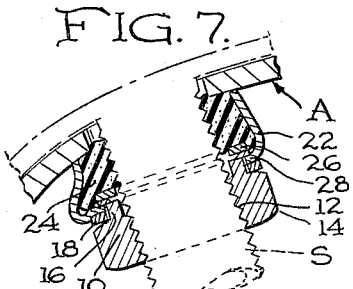
FIGURES 7 and 8 are enlarged cross-sectional views of the improved sealing grommet assembly depicted in sealed engagement with the fragmentarily illustrated valve stems and wheel rim apertures, as shown in FIGURES 1 and 2 respectively.
Figure 5:
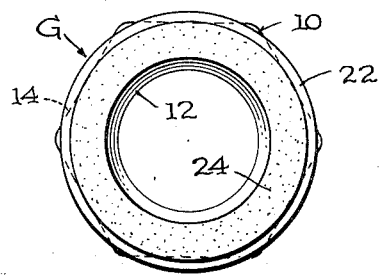
FIGURE 5 is a bottom plan view of the opposite or lower end of the grommet assembly.
Figure 8:
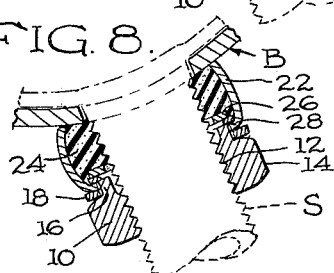

In FIGURES 7 and 8 of the drawing there is clearly shown the deformed grommet 24 and the housing shell 22 effecting a positive seal by the application of the novel principle of the collapsible seal in element 24 and the seal housing shell member 22 in operative combination thus establishing a fixed, non-rotatable position relative to the rim A or B and the valve stem S, due to the freely rotatable construction of the rim nut body 10 and the washer 18 relative thereto.

Accordingly, all of the objects and advantages as set forth in the preamble of this specification have been achieved as a result of the improved rim hole sealing grommet assembly G of the present invention.

While the invention has been shown, illustrated, described and disclosed in terms of an embodiment or modification which it has assumed in practice, the scope of the invention should not be deemed to be limited by the precise embodiment or modification herein shown, illustrated, described or disclosed, such other embodiments or modifications intended to be reserved especially as they fall within the scope of the claims here appended.

I claim as my invention:

1. A rim-hole sealing grommet assembly for use with tire valve stems and wheel rims of the class described, which comprises:
   (a) an elongated rim nut body having an internally threaded opening therein;
   (b) a sealing-grommet-housing comprising a deformable hollow shell means so constructed and arranged to simultaneously deform axially and radially in response to a force being exerted thereon;
   (c) a compressible sealing grommet disposed within said deformable grommet-housing and having a central opening therethrough for enabling a valve stem to pass therethrough;
   (d) said nut body being provided with means for loosely attaching one end portion of said deformable shell means thereto;
   (e) a radially inwardly directed lip formed adjacent one end portion of said deformable shell means to facilitate attachment of said deformable shell means to said nut body; together with
   (f) a first bearing washer interposed between said lip of the attached end portion of said deformable shell means and said nut body; and
   (g) a second bearing washer interposed within said deformable shell means between one end portion of said compressible sealing grommet and said nut body; with (h) said bearing washers being respectively disposed in conjunction with said means for loosely attaching said deformable shell means to said nut body to help facilitate the free relative rotation between said nut body and said deformable shell means and said sealing grommet respectively.

2. A rim-hole sealing grommet assembly for use with tire valve stems and wheel rims of the class described, which comprises:
   (a) an elongated rim nut body having an internally threaded opening therein;
   (b) a sealing-grommet-housing comprising a deformable hollow shell means so constructed and arranged to simultaneously deform axially and radially in response to a force being exerted thereon;
   (c) a compressible sealing grommet disposed within said deformable grommet-housing and having a central opening therethrough for enabling a valve stem to pass therethrough;
   (d) a tool-engaging head formed adjacent one end portion of said nut body;
   (e) a radially inwardly directed lip formed adjacent one end portion of said deformable shell means to facilitate attachment of said deformable shell means to said nut body; together with
   (f) a first bearing washer interposed between said lip of the attached end portion of said deformable shell means and said nut body; and
   (g) a second bearing washer interposed within said deformable shell means between one end portion of said compressible sealing grommet and said nut body; with
   (h) said nut body being provided with means for loosely attaching one end portion of said deformable shell means to said nut body comprising;
   (i) an outwardly flared retaining lip disposed in spaced relationship to said tool-engaging head by a distance equaling slightly more than the combined thickness of said first bearing washer and said lip of the deformable hollow shell means;
   (j) said bearing washers being respectively disposed in conjunction with said retaining lip for loosely attaching said deformable shell means to said nut body to help facilitate the free relative rotation between said nut body and said deformable shell means and said sealing grommet respectively.

3. A rim-hole sealing grommet for use with tire valve stems and wheel rims of the class described, which comprises:
   (a) an elongated rim nut body having an internally threaded opening therein;
   (b) a sealing-grommet-housing comprising a deformable hollow shell means so constructed and arranged to simultaneously deform axially and radially in response to a force being exerted thereon;
   (c) a compressible sealing grommet disposed within said deformable grommet-housing and having a central opening therethrough for enabling a valve stem to pass therethrough;
   (d) a tool-engaging head formed adjacent one end portion of said nut body;
   (e) a radially inwardly directed lip formed adjacent one end portion of said deformable shell means to facilitate attachment of said deformable shell means to said nut body; together with
   (f) a first bearing washer interposed between said lip of the attached end portion of said deformable shell means and said nut body; and
   (g) a second bearing washer interposed within said deformable shell means between one end portion of said compressible sealing grommet and said nut body; with
   (h) said nut body being provided with means for loosely attaching one end portion of said deformable shell means to said nut body comprising;
   (i) an outwardly flared retaining lip disposed in spaced relationship to said tool-engaging head by a distance equaling slightly more than the combined thickness of said first bearing washer and said lip of said deformable hollow shell means;
   (j) said outwardly flared annular retaining lip of said nut body being formed from a relatively thin and substantially weakened portion of said nut body which may be readily sheared off from said nut body during application thereof to a valve stem to help assure the free relative rotation of said nut body with respect to said sealing grommet and said deformable shell means.

4. In combination with a valve stem of a vehicle tire or the like, a rim-hole sealing grommet assembly comprising:
   (a) an elongated rim nut body having a tool-engaging head adjacent one end portion thereof, said nut body having an internally threaded opening therein, and an annular shoulder terminating in a relatively short deformable annular retaining lip of substantially reduced wall thickness adjacent the other end portion thereof;
   (b) a sealing-grommet-housing comprising a deformable hollow shell means so constructed and arranged to simultaneously deform axially and radially in response to a force being exerted thereon;
   (c) said deformable hollow shell means having an inturned annular lip adjacent one end portion thereof for placing over said annular shoulder and thus being retained thereon by said annular retaining lip of said nut body;
   (d) a bearing washer loosely disposed between said foregoing annular lip;
   (e) a compressible sealing grommet supportingly carried by and with the major portion thereof disposed within said shell means;
   (f) a second bearing washer disposed intermediate the end of said grommet within said shell and said retaining lip of said nut body.

5. The combination of:
   (a) a wheel rim having a rim hole therein,
   (b) a tire valve assembly mounted in said rim hole with a portion of said valve assembly extending from said rim,
   (c) said portion of said valve assembly having a part which is externally threaded,
   (d) a rim hole sealing grommet assembly comprising;
   (e) an elongated rim nut body having an internally threaded opening which is adapted to engage the complementary threads on said external threaded part of said valve assembly,
   (f) a sealing grommet housing comprising a deformable hollow shell means so constructed and arranged to simultaneously deform axially and radially in response to a force being exerted thereon,
   (g) a deformable sealing grommet disposed within said deformable grommet housing and having a central opening therethrough for enabling said part of said valve assembly to pass therethrough,
   (h) a tool engaging head formed adjacent one end portion of said nut body,
   (i) said nut body being provided with means for loosely attaching one end portion of said deformable shell means whereby said nut is freely rotatable relative to the sealing grommet and the deformable shell means.

6. The rim hole sealing grommet assembly as defined in claim 5 wherein:
   a bearing washer is loosely disposed between the attached end portion of the deformable shell means and the nut body to help facilitate free relative rotation of the nut body relative to said shell means and the sealing grommet.

References Cited by the Examiner

UNITED STATES PATENTS 1,423,598 7/1922 Charter _____ 152—427 X
2,054,965 9/1936 Clo _____ 152—427
2,475,451 7/1949 Gouirand _____ 152—427
2,823,724 2/1958 Gill _____ 152—427

FOREIGN PATENTS 915,863 1/1963 Great Britain.

ARTHUR L. LA POINT, *Primary Examiner.*

C. W. HAEFELE, *Assistant Examiner.*